United States Patent [19]

Kuckes

[11] Patent Number: 4,700,142
[45] Date of Patent: Oct. 13, 1987

[54] METHOD FOR DETERMINING THE LOCATION OF A DEEP-WELL CASING BY MAGNETIC FIELD SENSING

[75] Inventor: Arthur F. Kuckes, Ithaca, N.Y.

[73] Assignee: Vector Magnetics, Inc., Ithaca, N.Y.

[21] Appl. No.: 848,194

[22] Filed: Apr. 4, 1986

[51] Int. Cl.[4] .................. G01V 3/08; G01V 3/26; E21B 7/04; E21B 47/02
[52] U.S. Cl. .................................. 324/346; 33/304; 166/66.5; 175/45
[58] Field of Search ............... 324/323, 346, 356, 369; 166/65 M, 250, 254; 175/40, 45, 50; 33/302, 304, 313; 73/152; 364/422

[56] References Cited

U.S. PATENT DOCUMENTS

| | | |
|---|---|---|
| 2,521,745 | 6/1949 | Pope . |
| 2,524,360 | 10/1950 | Russell . |
| 2,599,687 | 4/1949 | Brant . |
| 2,656,505 | 10/1953 | Hewitt, Jr. . |
| 2,723,374 | 11/1955 | Williams . |
| 3,100,350 | 8/1963 | Brown .................. 33/313 |
| 3,256,480 | 6/1966 | Runge et al. . |
| 3,282,355 | 11/1966 | Henderson . |
| 3,285,350 | 11/1966 | Henderson . |
| 3,369,174 | 2/1968 | Groenendyke et al. . |
| 3,406,766 | 10/1968 | Henderson . |
| 3,479,581 | 11/1969 | Runge . |
| 3,488,574 | 1/1970 | Tanguy . |
| 3,697,864 | 10/1972 | Runge . |
| 3,722,605 | 3/1973 | Isham . |
| 3,725,777 | 4/1973 | Robinson et al. . |
| 3,731,752 | 5/1973 | Schad . |
| 3,778,701 | 12/1973 | Runge . |
| 3,791,043 | 2/1974 | Russell . |
| 3,862,499 | 1/1975 | Isham et al. . |
| 4,016,942 | 4/1977 | Wallis, Jr. et al. . |
| 4,021,774 | 5/1977 | Asmundsson et al. . |
| 4,072,200 | 2/1978 | Morris et al. . |
| 4,163,324 | 8/1979 | Russell et al. . |
| 4,323,848 | 4/1982 | Kuckes . |
| 4,361,192 | 11/1982 | Trowsdale .................. 33/313 X |
| 4,372,398 | 2/1983 | Kuckes . |
| 4,443,762 | 4/1984 | Kuckes . |
| 4,510,696 | 4/1985 | Roesler .................. 33/313 |
| 4,529,939 | 7/1985 | Kuckes . |

OTHER PUBLICATIONS

Broding, R. A., "Magnetic Well Logging", *Geophysics A Journal of General and Applied Geophysics*, vol. XVII, pp. 1-26, Jan. 1952.
Kuckes, Arthur F. et al., "An Electromagnetic Survey Method for Directionally Drilling a Relief Well Into a Blown Out Oil or Gass Well", *Society of Petroleum Engineers Journal*, pp. 269-274, Jun. 1984.
Robinson, J. D., "Magnetostatic Methods for Estimating Distance and Direction from a Relief Well to a Cased Wellbore", *Journal of Petroleum Technology*, pp. 741-749, Jun. 1972.
West, C. L., "Successful ELREC Logging for Casing Proximity in an Offshore Louisiana Blowout", *Society of Petroleum Engineers of AIME*, SPE 11996, pp. 1-8, Oct. 5-8, 1983.

*Primary Examiner*—Gerard R. Strecker
*Attorney, Agent, or Firm*—Jones, Tullar & Cooper

[57] ABSTRACT

Logging apparatus for measuring alternating magnetic fields generated by electric current flow on a subterranean target near a borehole is disclosed. Electric current of a predetermined temporal form is made to flow on the target; the resulting magnetic field is measured by magnetometers in a downhole sonde. The orientation of the sonde is fixed by various combinations of gyroscope, accelerometer, magnetometer measurements, and borehole survey data.

10 Claims, 11 Drawing Figures

METHOD FOR DETERMINING THE LOCATION OF A DEEP-WELL CASING BY MAGNETIC FIELD SENSING

BACKGROUND OF THE INVENTION

The present invention relates, in general, to a method of locating the borehole of a deep well at a substantial distance below the earth's surface, and, more particularly, to a method for locating such a well bore by means of a magnetic field produced by current flowing in the casing of such a well bore, and without the need to use the earth's magnetic field for orientation purposes.

It is well known that in drilling deep wells for oil and gas exploration, precise control of the path followed by the well is extremely difficult, so that it is virtually impossible to know the exact location of the well at a given depth. For example, a drilling tolerance of plus or minus one quarter of a degree will allow the bottom of a 10,000-foot well to be positioned anywhere within a circle 100 feet in diameter, and numerous factors can increase the deviation. This is not of particular concern in normal drilling operations, but if an accident should occur, such as a rupture in the casing of the well which causes the well to blow out, it may become necessary to plug the well at or below the point of the rupture to bring it under control. In order to do this, a relief well must be drilled to intersect the original well at the desired level, and since such blowouts produce extremely hazardous conditions at the surface in the vicinity of the original well, the relief well must be started a considerable distance away and drilled at an incline in order to protect the personnel and the equipment used.

Because the same problems of control of the direction of drilling are encountered in the relief well as were encountered in the original well, the location of the relief well bore cannot be determined with precision; accordingly, it is extremely difficult to determine the distance and direction from the relief well to the blown out well. A further difficulty is that in some cases the force of the explosion resulting from the rupturing of a well casing can do so much damage at the surface that it may be difficult to say exactly where the well head is, much less where the well is located at a depth of 10,000 feet or more. Because of the danger at the well head, the relief well is started one-half mile or more away from the area of the original wellhead, angles toward the original well until it approaches relatively closely, and then follows the original well to the location where the wells are to intersect. Thus, the relief well usually is very complex, compounding the problem of knowing exactly where it is located with respect to the original well.

Numerous attempts have been made to provide accurate measurements of well location, and many surveying techniques are available which can give general information as to the location of a relief well with respect to a target well. However, such survey techniques are not capable of providing accurate data concerning the relationship of the relief well to the original well until the relief well has approached very near the original well; i.e., within a few tens of feet. At that point, equipment such as the "Magrange" (magnetic gradient ranging) system developed by Tensor, Inc., of Austin, Tex., and Houston Oil and Minerals Research and Development, Inc., can be used with considerable accuracy; but it has been found that outside a radius of a few tens of feet, the Magrange system is usually inadequate.

In an attempt to extend the distance at which accurate information can be obtained, a variety of electrical well logging techniques have been used which treat the target well as an anomaly in the geologic structure of the earth surrounding the relief well. The art of electrical well logging is highly developed, and although systems such as the "ULSEL" (ultra-long-spaced electrode logging) system have been successfully used in locating geologic anomalies of certain types, they have been less than satisfactory in guiding relief well bores to locate and intersect existing boreholes. The ULSEL system is described extensively in the patent literature; particularly in U.S. Pat. Nos. 3,256,480; 3,479,581; 3,697,864; and 3,778,701, all issued to Richard J. Runge. As described in these patents, the system is directed to the measurement of the apparent resistivity of the earth across a pair of electrodes and, since no directionality is given by this method, it is ineffective for directing a relief well toward an existing well.

In addition to the resistive-type logging of geological strata described in the foregoing patents, there have been attempts to obtain similar data through the use of electromagnetic prospecting. Such a system is illustrated, for example, in U.S. Pat. No. 2,723,374, to Williams, which is directed to lateral exploration from a borehole to determine the magnitude and direction of resistive anomalies in the earth. Such resistive anomalies result in variations in the pattern of an electrical current injected into the earth from electrodes mounted in the same borehole as a pair of induction sensing coils mounted at right angles to each other. These sensing coils detect massive resistive anomalies such as ore bodies, salt domes, reefs, or dipping strata which have conductivities different from the conductivities of adjacent beds, and which therefore disturb the electrical current flow. The sensing coils are used in conjunction with other conventional well logging systems to determine the probable location of mineral deposits. However, such systems do not suggest the possibility of locating relatively small targets such as well bores.

Other systems have been developed for directing a second well with respect to a first well to permit intersection of the two. One such system is described in U.S. Pat. No. 3,282,355, to Henderson, wherein a relief well is controlled to intersect a blown-out well by the use of sonic detectors responsive to the sound produced by fluids flowing out of the blown well formation. However, such a system will not operate when there is no sound emanating from the target well, and, in addition, does not provide the required degree of directional and distance accuracy. Another proposal in the prior art is the use of a signal transmitter in one well and a signal receiver in the other well. For example, in patents such as U.S. Pat. Nos. 3,285,350, to Henderson, 3,722,605, to Isham, and 4,016,942, to Wallis, et al., soundwaves are used as the signals, while in U.S. Pat. No. 3,731,752, to Schad, and U.S. Pat. No. 3,406,766 to Henderson, the signal is a magnetic field produced by an electromagnet. In all of these systems, however, the target well must be accessible so that the signal source can be placed in one well and the receiver in the other, and they are not effective where the target well is not open, or where there is a chance of an explosion or fire that would endanger personnel.

Many of the difficulties outlined above were overcome by the methods and apparatus disclosed in U.S.

Pat. No. 4,323,848, and U.S. Pat. No. 4,372,398, of Arthur F. Kuckes, the disclosures of which are incorporated herein by reference. In accordance with the '398 patent, an electric current flow is produced in the casing of a target well, or borehole, by injecting a current into the earth surrounding the target well through the use of an electrode located in the relief borehole. This electrode is carried by the logging cable and contacts the uncased sides of the relief borehole so that a current flow is established in the vicinity of the relief hole. This current flow extends between the downhole electrode and a second electrode which, in a preferred form of the invention, is located at the earth's surface in the vicinity of the head of the relief well. The injected ground current finds a path of least resistance through the casing or other current-conducting material in the target borehole, and the resulting concentration of current produces a magnetic field surrounding the target well which can be detected by a field sensor such as that described in the '848 patent. The sensor disclosed in the '848 patent is extremely sensitive to very small magnetic fields, and permits an accurate detection of currents flowing in borehole casings located a considerable distance away from the relief hole. The current generated in the target borehole casing is an alternating current of relatively low frequency which produces a characteristic magnetic field that can be detected, and which produces a corresponding output signal from the AC magnetic field sensor.

The signals obtained from the AC magnetic field sensor, in accordance with the aforesaid patents, provide a measure of the direction and distance to the target well casing. In the course of drilling the relief well, such measurements are taken periodically at selected depths, and the resulting measurements, when taken with simultaneous measurements of the earth's static magnetic field to provide a stable reference point for orientation of the sensor, will, in accordance with U.S. Pat. No. 4,372,398, permit a continuous calculation of the presumed location of the target well with respect to the location of the AC magnetic field sensor in the relief well. This information can be used to guide further drilling of the relief well. Thus, as the relief well approaches a desired depth, its approach to the location of the target well can be guided so that the target well is intersected at the desired depth below the earth's surface in a rapid and effective manner without ambiguity, and with resulting savings in the cost of drilling a relief well.

Although the method and the apparatus set forth in the aforesaid patents of Arthur F. Kuckes have been found to be extremely effective, it has been found that the method of establishing the location and orientation of the magnetic field sensor within the relief well may, in some circumstances, be better carried out through methods and apparatus other than those required to detect and measure the earth's magnetic field, since in some cases that field is distorted or the measurements become unreliable.

In order to determine the direction of the target well from the data received from an AC magnetic field sensor in a relief well, a complete specification of the sensor orientation in space is needed at each station where measurements are made. This orientation is obtained, in accordance with U.S. Pat. No. 4,372,398, by a measurement of two vector components of the earth's magnetic field which lie in the plane perpendicular to the axis of the sensor. Under many conditions, this method of using the earth's magnetic field for sensor orientation is very effective. However, if, for example, the borehole axis nearly coincides with the earth's magnetic field lines, this method is imprecise. Further, if the earth's magnetic field is perturbed by ferromagnetic effects around the relief well or the target well, the determination of sensor orientation may be faulty. Thus, alternate methods of determining sensor orientation in order to precisely locate a target well are required.

SUMMARY OF THE INVENTION

It is, therefore, an object of the present invention to provide an improved method of precisely drilling relief wells to intercept electrically conductive targets.

It is a further object of the present invention to provide an improved method and apparatus for determining the orientation of a sensor in a relief well so as to accurately determine the distance and direction of an electrically conductive target.

A still further object of the invention is to provide a apparatus and method for determining the direction to a target well from a sensor in a relief well through a precise measurement of the orientation of the sensor, together with a precise measurement of the strength and relative direction of an AC magnetic field produced by current flow at the target.

It is another object of the present invention to provide a method of guiding the drilling of a relief well toward a target well while avoiding the effects of perturbations of the earth's field in the region of the target well or the relief well.

A still further object of the invention is to provide an improved sensor apparatus for detecting an AC magnetic field and for providing data concerning the orientation of the sensor.

Another object of the invention is to provide a system for determining the distance and direction of a target well in which an AC current flows from a relief well carrying an AC magnetic field sensor and apparatus for determining the orientation of the sensor in space.

Briefly, the method of the present invention includes the steps of producing a low-frequency, alternating electric current flow in the casing or other conductive material in a target well and, during periodic interruptions in drilling a relief well, taking measurements at selected depth intervals of the magnitude and direction of the magnetic field produced by the current flow in the target well. At the same time these measurements are made, additional measurements are made of the orientation of the sensor in space. This may be done, for example, by determining the orientation of the sensor within the relief well, and, in addition, by making measurements of the inclination and direction of the relief well from readily available conventional borehole survey data. From these measurements, the apparent direction and distance to the target well can be determined. Based upon the information derived from periodic measurements of sensor orientation and relief well direction, the relationship between the relief and target wells can be established with a higher degree of accuracy than was heretofore possible.

More particularly, and in accordance with a preferred embodiment of the present invention, an electric current flow is produced in the casing of a target well, or borehole, by injecting a current into the earth surrounding the target well through the use of an electrode located in the relief well. This electrode is carried by the logging cable and contacts the uncased sides of the relief well, so that a current flow is established in the vicinity of the relief well. This current flow extends between the downhole electrode and a second electrode which, in the preferred form of the invention, is located at the earth's surface in the vicinity of the head of the relief well. The injected ground current finds a path of least resistance through the casing of the target borehole, and the resulting concentration of current produces a magnetic field surrounding the casing which may be detected by a suitable field sensor, or sonde, incorporating a pair of magnetometers such as that described and claimed in U.S. Pat. No. 4,323,848. The magnetometers disclosed in that patent are extremely sensitive to very small alternating magnetic fields, and permit an accurate detection of currents flowing in borehole casings located a considerable distance away from the relief hole. In the preferred form of the invention, the current generated in the target borehole casing is an alternating current of relatively low frequency which produces a characteristic magnetic field that can be detected, to produce corresponding output signals from the magnetometers.

Although the current-generating electrode is located in the same borehole as the magnetic field sensor, current flow in the earth surrounding the relief borehole produces negligible noise signals, because it tends to be symmetrical around the borehole and thus produces cancelling magnetic fields.

Vector signals obtained from the magnetometers in the sensor provide a measure of the direction and distance of the target well casing. In the course of drilling the relief well, such vectorial measurements are taken periodically at selected depths. Simultaneous measurements are made of the orientation of the sensor within the borehole, and these, together with measurements of the relief well direction either from measurements at the same time or from previously made borehole survey data, permit a continuous calculation of the presumed location of the target well with respect to the location of the relief well. This calculated information can be used to guide further drilling of the relief well. As the relief well approaches the desired depth, its approach to the location of the target well can be guided so that the target well is intersected at the desired depth below the earth's surface in a rapid and effective manner without ambiguity and with resulting savings in the cost of drilling the relief well.

In accordance with the present invention, the reference point from which the distance and direction to the target well is measured, is determined from two measurements which do not involve the earth's magnetic field. First, a measurement is made of the direction of the relief well at the location of the sensor. This direction can be obtained from measurements of the hole made at the same time the sensor measurements are made, or can be obtained from conventional borehole survey data. The second measurement is a determination of the rotational orientation of the sensor within the relief well. This rotational orientation can be obtained, in accordance with one embodiment of the invention, by means of one more gyroscopes connected in the borehole tool, or sensor, which is carrying the AC field magnetometers. In principle, such gyroscopes would meet the needs of the present invention, for a commercially available gyroscopic borehole surveying unit can be coupled with a pair of AC magnetometer sensors to provide a self-contained targeting system. However, gyroscopic units are usually large and expensive, and are not well suited to operation in open-hole environments because of their sensitivity to shock, and because of their temperature limitations.

In boreholes which are not vertical, the use of two vector accelerometers with axes perpendicular to each other and to the axis of the sensor tool, together with borehole survey data, will provide a unique determination of sensor orientation, in accordance with a preferred form of the invention. This method of orientation is particularly attractive when the borehole axis is closely aligned with the earth's magnetic field or where the earth's magnetic field is sufficiently perturbed that the use of a compass is difficult. The sole use of accelerometers also makes it possible to make range and direction measurements of a target with the sensor tool located inside a drill pipe or drill collar that block measurements of the earth's static magnetic field.

When the relief borehole is within a few degrees of being vertical, the sensor device may not lie precisely aligned with the low side of the borehole, and, in such a case, complete reliance on accelerometers for orientation determination may not be sufficiently precise. In this situation, the measurement of one component of the earth's magnetic field perpendicular to the borehole axis, together with at least one component of gravity through the use of an accelerometer, can greatly enhance the precision of measurement.

BRIEF DESCRIPTION OF THE DRAWINGS

The foregoing and additional objects, features, and advantages of the present invention will become apparent to those of skill in the art from a more detailed consideration thereof, taken in conjunction with the accompanying drawings in which.

DESCRIPTION OF PREFERRED EMBODIMENTS

Figures 1, 2:
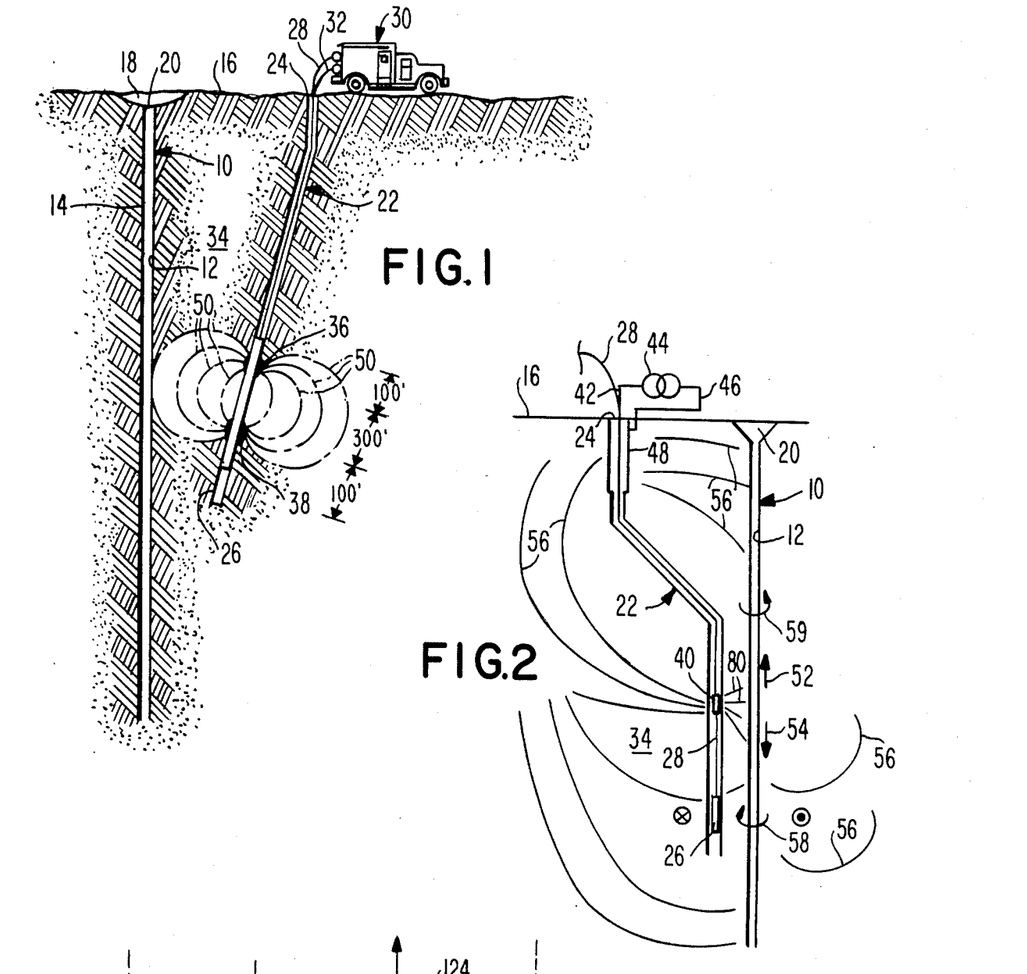
FIG. 1 is a diagrammatic illustration of a method of locating a target well by a relief well, utilizing a first electrode arrangement.
FIG. 2 is a diagrammatic illustration of a method of locating a target well utilizing a second electrode arrangement.

The borehole locating methods of the present invention may be described in general terms with respect to the illustration of FIG. 1, which represents one technique for producing an alternating current flow in the casing of a target borehole. The target well, or borehole, is illustrated at 10, and represents, for example, a gas well having a steel casing 12 which has ruptured at an area 14 which may be at any depth. This diagram illustrates a well being logged at about 9000 feet in which a rupture occurred at a depth of about 2,000 feet below the surface 16 of the earth while the well was being drilled, and after the drilling operation had passed the 19,000-foot mark. In an actual situation where this occurred, the resulting explosion blew away a 177-foot high drilling rig and left a crater, illustrated at 18, which was 100 feet deep. Although that well was closed at the well head 20, for safety it became necessary to inject a cement plug deeper in the well, below the rupture and at sufficient depths for drilling mud to hold off the pressure and to insure that no further explosions could occur. In order to do this, however, it was necessary to drill a relief well, generally indicated at 22, which would intersect the well 10 so that the target well could be plugged by material fed down the relief well. The present invention is directed to methods and apparatus for guiding such a relief well 22 so as to intersect a target well 10 at a selected depth.

Although, FIG. 1 illustrates wells 10 and 22 as being relatively straight, in reality such wells are more complex, since the direction a drill moves through the earth cannot be controlled precisely. Even a very small deviation in the direction of the drill can result in a significant change in the location of the borehole at large distances below the surface, so that at the 10,000 foot mark, the target well 10 can be anywhere within the circle having a diameter of 100 feet or more. The relief well 22 is subject to the same control problems, but in addition it must be started a safe distance from wellhead 20 in order to protect the personnel and the equipment used to drill the relief well. Thus, a relief wellhead 24 may be as much as one-half mile away from the wellhead 20, so that borehole 22 must be drilled at complex angles which will cause it to travel straight down for a distance, then curve toward an intersection with the target well at its assumed location at a depth of about 9,000 feet, and as it approaches the well 10, to straighten and travel in a direction parallel to the target well to the depth at which the target well is to be plugged. Since the same drilling error exists for the relief well as existed for the original well, the exact location of the relief well will also be unknown, and may also be anywhere within a circle having a diameter of 100 feet or more. Thus, ordinary drilling tolerances could result in the relief well 22 being 200 feet or more away from the target well 10 in the absence of extremely accurate methods such as those set forth in U.S. Pat. No. 4,372,398, as further improved by the methods set forth herein.

For the initial drilling of a relief well 22, conventional surveying techniques provide satisfactory guide to the drillers. However, as the relief well approaches to within 150 or 200 feet of the target well, more accurate measurements are required. Accordingly, in accordance with the present invention, as the relief well is drilled, the drilling tool is periodically withdrawn from the borehole 22 and a sensor tool 26, which is secured to a conventional well-logging cable, or wireline, 28, is lowered down the borehole 22 by means of conventional well-logging equipment carried by vehicle 30. The sensor 26 preferably is of the type described and claimed in U.S. Pat. No. 4,323,848, and incorporates a pair of magnetometers comprising two pairs of elongated U-shaped cores of laminated, high-permeability metal, with adjacent portions of each pair being surrounded by a corresponding sensing coil. The two sensing coils are horizontal, and are arranged at right angles to each other along x and y axes of a horizontal reference plane which is perpendicular to the longitudinal axis of the sensor with the legs of the two cores in each pair extending vertically in opposite directions, parallel to the sensor axis. Each coil produces an output signal proportional to a corresponding x or y horizontal component of the magnetic field vector intercepted by its corresponding pair of U-shaped laminated cores, and the two output signals are supplied by way of a signal cable 32 to equipment in the logging vehicle 30 which records and processes these signals for use in determining the magnitude and direction of the detected magnetic field.

The magnetic field to be detected by the sensor 26 is the AC field which is produced by alternating current flow in the casing 12 of the target well 10 resulting from the injection of alternating current into the earth 34 surrounding the wells. In the embodiment of FIG. 1, a pair of electrodes 36 are secured to well-logging cable 28 and are lowered into the borehole 22 with the sensor 26. In the embodiment of FIG. 2, a single electrode 40 is secured to cable 28. In both cases, the cable is electrically insulated, for example by an insulating jacket, and the electrodes 36 and 38 or the electrode 40 are secured a considerable distance away from the sensor 26 so that current flow in the ground in the immediate area of the sensor does not appreciably affect the sensor output. The ground current will vary in the region of the two wells in accordance with variations in the geologic strata. The electrodes will contact the sides of the borehole 27, since the borehole is uncased, so that upon application of an alternating current to the electrode, current is injected into the earth 34. Current is supplied to the electrodes by means of power cables not shown in FIG. 1, but illustrated at 42 in FIG. 2 as being connected to a source of alternating current 44. The power cable is supported in the well by cable 28. The electrodes 36 and 38 are connected to opposite sides of the AC source in the embodiment of FIG. 1, while in FIG. 2 the AC return line 46 is connected to a return electrode at the earth's surface which may be, for example, a steel casing for the upper 300 feet or so of the relief well, as generally indicated at 48.

As diagrammatically illustrated in FIGS. 1 and 2, the injected current from the electrodes flows outwardly in all directions in a generally symmetrical pattern, with a part of the current being intercepted by, and flowing in, the casing 12 of the target well. As shown in FIG. 1, with two electrodes 36 and 38 in the relief well, the current flows in the substantially symmetrical path indicated at 50, whereas in the single electrode arrangement of FIG. 2, the current flows outwardly from electrode 40 through the ground toward the ground connection 48, generally in a symmetrical path around the relief well in the region of the electrode, the symmetry of the current paths depending upon the conductivity of the surrounding geological formations. As illustrated in FIG. 2, the current which is intercepted by the casing or other conductive material in the relief well 10, flows in both directions from the region of the electrode 40, some of the current flowing upwardly as indicated by arrow 52 and some flowing downwardly as indicated by arrow 54.

To prevent the injected current from reaching and interfering with the sensor 26, in the embodiment of FIG. 1, the electrodes 36 and 38 are spaced apart by about 300 feet and the lowest electrode is spaced at least 100 feet from the sensor.

In the arrangement of FIG. 2, the cable 28 supports the sensor 26 at a distance of approximately 300 feet below the electrode 40, with the lowest 500 feet of the cable being electrically insulated, by neoprene, for example.

The injected current from electrodes 36 and 38 generally follows the path indicated by lines 50 in FIG. 1, while the current injected by electrode 40 follows the path generally indicated by lines 56 in FIG. 2. In places where the strata through which the holes are drilled is uniform and has horizontally lying formations, the current flow will be azimuthally symmetric, and no magnetic field will be generated at the sensor 26 positioned directly below the electrode. The long, slender, vertical conductor formed by the well casing 12, by a drill stem (not shown), or by other electrically conductive material in the target well, alters the symmetry by concentrating the electric current, as indicated by the arrows 52 and 54. This current flow in the target well generates horizontally directed magnetic fields circulating around the target well in the manner illustrated by arrows 58 and 59. The magnetic field 58 generated by that portion of the target well current which is in the region of sensor 26 will be detected by the sensor which, in turn, will produce electric signals corresponding to the vector components of the that magnetic field lying in a plane perpendicular to the axis of the sensor. The signals, when combined with other measurements which permit orientation of the sensor, permit a determination of the direction and distance between the two wells at the location of the sensor.

The system of current injection shown in FIGS. 1 and 2, and particularly the latter figure, have produced good results. However, in cases where the target well does not go significantly deeper than the location of the sensor 26 in the relief well, or where the target is effectively insulated from the surrounding formations by a cement sheath or by hydraulic drilling fluid, a method of current injection from the surface has been found satisfactory. Thus, in FIG. 3, there is illustrated a third electrode arrangement for injecting current into the ground for producing current flow in the casing of a target well. As illustrated, the electrodes 36, 38 of FIG. 1, and the electrode 40 of FIG. 2 are eliminated, and in their place is a first electrode 60 positioned as close as possible to the wellhead 20 of target well 10. Second and third electrodes 61 and 62 are displaced symmetrically on either side of the borehole 10, preferably about two miles apart, in order to obtain a measurable flow of current at the location where the relief well is to intersect the target well. The source 44 of alternating current is connected between electrode 60 and electrodes 61 and 62, with cables 66, 67, and 68 providing the necessary connections to the electrodes. The earth 34 acts as the return connection from electrodes 61 and 62 to the electrode 60, whereby ground currents are injected into the earth as generally indicated at lines 70.

Figures 3, 4, 9:
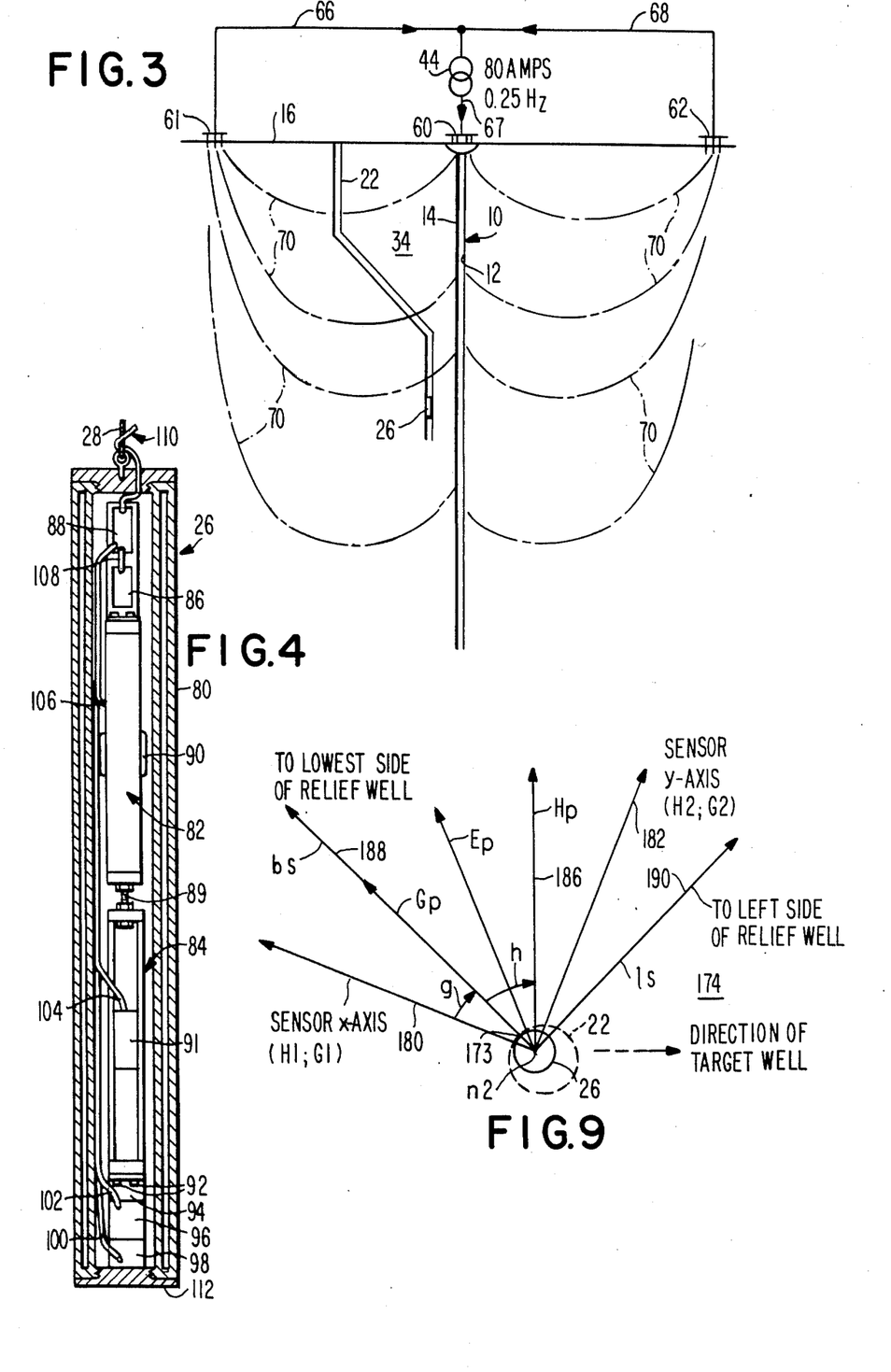
FIG. 3 is a diagrammatic illustration of a method of locating a target well from a relief well utilizing a third electrode arrangement.
FIG. 4 is a diagrammatic illustration, in partial section, of a magnetic field sensor utilizing a pair of magnetometers.
FIG. 9 illustrates the vectorial relationship of parameters measured at a sensor in a relief well.

The ground currents 70 flow to electrode 60 either directly through the earth or by way of the steel casing 12 or other current conducting material in the well 10, with the current in the casing producing a magnetic field having a horizontal component which can be detected by the sensor 26 in the relief well 22, in the manner described above. Since a major portion of the current returns to the ground electrode 60 before reaching the depth at which measurements are to be made, the magnitude of the current flow in the region of sensor 26 may be quite small at depths on the order of 10,000 feet; for this reason, an extremely sensitive magnetic flux detector is required in sensor 26. The fact that the well casing 12 may not be accessible at the surface 16 has little effect on either the magnitude or the pattern of current flow in and around the well at the depth which is of interest, although variations in the contact between the casing and the surrounding earth, as well as variations in the conductivity of the earth itself, will affect the relative amounts of current flowing in the casing and in the earth immediately surrounding the casing, and this will change the effective radius of the column of earth required to carry a current equal to the current in the casing 12.

To use the electric current flow on the well casing to find the target well, it is necessary to use a time varying current so that the magnetic field observed at the sensor 26 can be distinguished from the much larger magnetic field of the earth. In general, the higher the frequency which can be employed, the easier this measurement is; however, the well-known skin effect severely limits the penetration of an alternating current of high frequency into the earth. Because of this effect, a current of approximately 80 amperes at a frequency of 0.25 Hz must be injected into the ground by the electrodes 60, 61, and 62, in order to produce about 30 milliamperes of current flow on the well casing at 10,000 feet. A similar current flow can be attained at the higher 2 Hz frequency used in the embodiments of FIGS. 1 and 2. Such a current has been found to produce an alternating magnetic field equal to approximately 200 milligammas at a distance of about 100 feet from the casing 12 at that depth.

All three of the embodiments illustrated in FIGS. 1, 2, and 3 permit the measurement of the alternating magnetic field produced by the current flow on the target well 10. However, as indicated above, before an accurate determination can be made of the distance and direction of the target well from the location of the sensor 26 in the relief well, additional information concerning the orientation of the sensor is required. In accordance with the present invention, a suitable apparatus for determining that orientation is the provision of two accelerometers mounted in the sensor 26 and arranged to measure the two components of the earth's gravity vector which lie in a plane perpendicular to the longitudinal axis of the sensor. Sunstrand model 2180 "mini-pal servo accelerometers" have been found to be suitable for this purpose. These accelerometers preferably are secured within the sensor 26 in the manner illustrated in FIG. 4, and produce digital output signals which are transmitted by suitable telemetry to the surface equipment for processing along with the outputs of the sensor magnetometers. FIG. 4 illustrates in partial cross-section the sensor tool 26 which is used in the present invention. The unit comprises a housing 80 which receives a pair of magnetometers 82 and 84, a power supply 86, and an electronics package 88 which includes the various amplifiers, filters, multiplexers, and other downhole circuitry required to operate the sensor and transmit the data which it provides to the surface equipment. The housing 80 preferably is a double-walled tubular container of the vacuum bottle type which serves to insulate the contents of the housing from the heat encountered in a typical downhole environment. Thus, the housing 80 is constructed with inner and outer walls defining an interior space which is closed and sealed at both ends so that a vacuum is maintained therein. The outer diameter of the housing is substantially less than the five-and-one-half inch inner diameter of the typical exploratory well, and preferably has a diameter of about four inches, so that the unit moves easily within a borehole. The housing 80 is constructed of a nonmagnetic metal to provide the strength required for the borehole environment, while permitting detection of the surrounding magnetic fields.

The magnetometers 82 and 84 are removably mounted within the housing 80, with magnetometer 82 being located near the upper end of the housing and magnetometer 84 being located in the lower end thereof, the two sensors being secured together in spaced, end to end, coaxial relationship by means of a suitable fastener 89. The two magnetometers are mounted so their sensing coils 90 and 91 are at right angles to each other, with one magnetometer measuring the vector components of magnetic fields in the "x" direction, and the other measuring the vector components of magnetic fields in the "y" direction of a plane perpendicular to the longitudinal axis of the sensor. Radially extending spacers (not shown) mount the magnetometers 82 and 84 in the center of the housing 80 and securely hold them in place during use of the unit.

Secured to the lower end of the magnetometers, as by means of fasteners 92, is a mounting board 94 which carries first and second accelerometers 96 and 98, which preferably are aligned with the magnetometers 82 and 84, to measure the x and y axis vectors of the earth's gravitational field, projected onto a plane perpendicular to the longitudinal axis of the sensor 26. The measurement of the direction of gravity from the sensor provides a way to orient the sensor 26 in space, and to provide a reference for the alternating magnetic field measurements, as will be explained in greater detail hereinbelow.

Electric cables 100, 102, 104, and 106 connect the accelerometers and the magnetometers to the electronics package 88, while cable 108 connects the power supply 86 to the electronics. The borehole wire line 28 supports an electrical cable 110 by which the signals from the accelerometer and the magnetometers are transmitted to the surface equipment.

The use of accelerometers in combination with the magnetometers in the sensor tool 26 produces excellent results when the relief well is nonvertical, as is usually the case. When survey data of the relief well are also available, as is also usually the case, the exact direction of the target well with respect to the sensor tool can be computed with a high degree of accuracy. If borehole survey data are not available, then the use of the magnetometer data in combination with the accelerometer data produces a direct determination of whether the relief well must be turned right or left to intersect the target well, without giving an absolute direction. The present method has the distinct advantage of avoiding the ambiguities present in many prior methods of target well determination.

In an alternative form of the invention, the accelerometers 96 and 98 can be replaced by a self-contained borehole gyroscopically stabilized orientation package of the type produced by Humphrey, Inc., Part No. DG76-01-01. This unit consists of a single axis gyroscope on a servo-stabilized horizontal platform which is controlled by two inclinometers whose axes are perpendicular to the axis of the sensor tool 26. This unit produces three outputs which give the "Euler" angles of the direction of the relief well, and the orientation within the relief well of the "tool face"; i.e., the bottom surface of the sensor 26, indicated at 112 in FIG. 4. The analog outputs of the inclinometers are multiplexed, and digitized by electronics package 88 and are sent to the surface equipment for further processing.

Depending upon the amount of current injected into the earth by the electrodes and further depending upon the signal averaging time, the sensor 26 can detect an alternating magnetic field and its phase due to current flow in a casing about 200 feet or more from the location of the target well. By plotting the changes in amplitude and direction of the magnetic field as the drilling of the relief well progresses, the distance and direction of the target well can be determined with good accuracy. It should be noted that each measurement is made over a period of several seconds, so that signal averaging techniques can be used to determine the amplitude and phase of the alternating magnetic field to a high degree of resolution.

Figure 5:
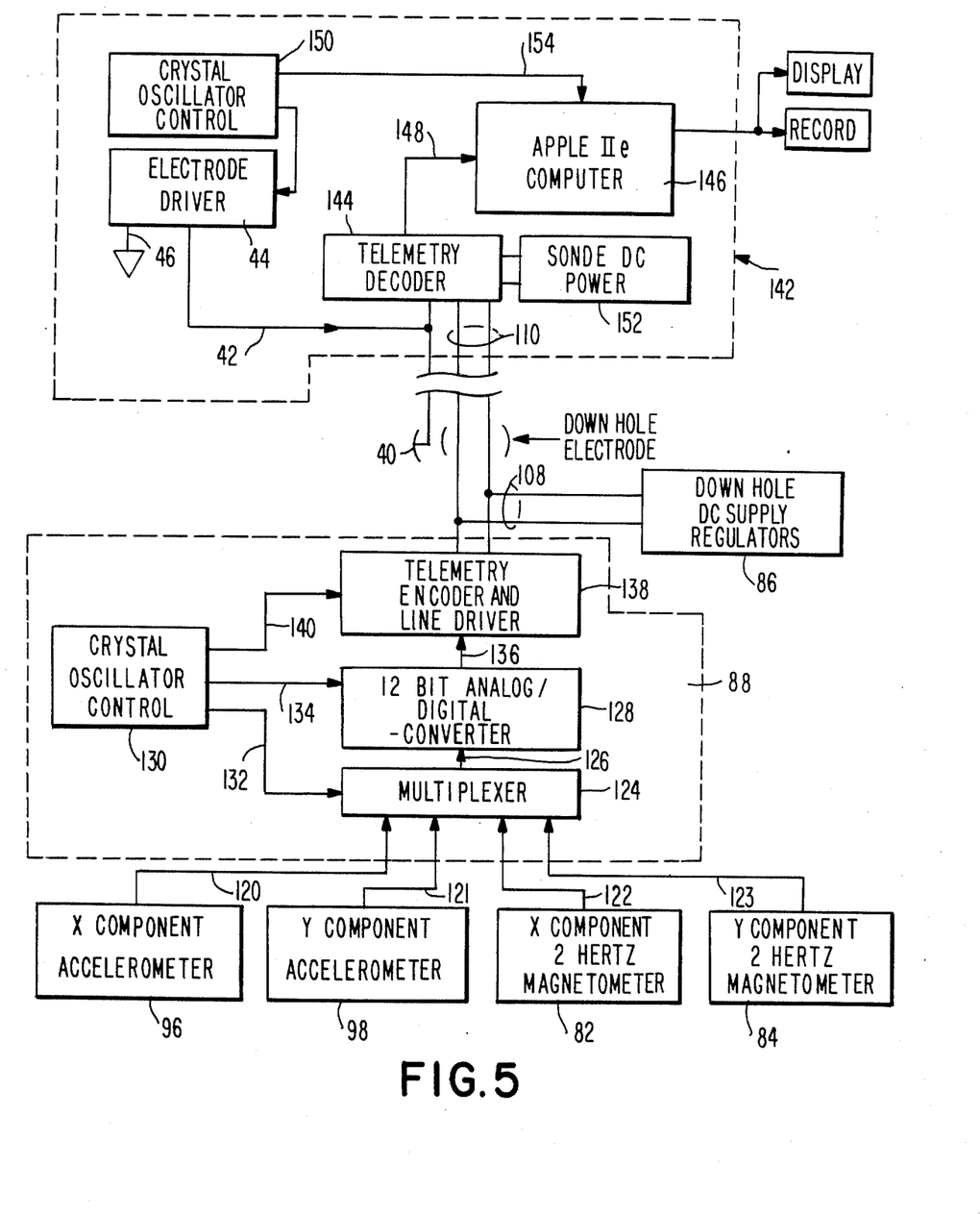
FIG. 5 is a block diagram of the electronic circuitry of a preferred form of the present invention.

The electrical circuitry for the present system is illustrated in FIG. 5 in block diagram form, and includes x and y component accelerometers 96 and 98, respectively, and x and y component magnetometers 82 and 84, respectively. As previously indicated, the x and y axes for the accelerometers and the magnetometers preferably are the same, these elements all being fixedly mounted within the housing 80, as previously explained. The two accelerometers are mounted so as to measure the x and y components of gravity in a plane perpendicular to the longitudinal axis of the sensor 26, and the two magnetometers measure the alternating components of the magnetic field along the same x and y axes in the same plane. The outputs from all four of these detectors are supplied by way of lines 120-123 to a multiplexer 124, which samples them sequentially and feeds the sampled signals by way of line 126 to a 12-bit analog to digital (A/D) converter 128. The timing of the multiplexer is controlled by a crystal oscillator 130, the output of which is supplied by way of line 132 to the multiplexer and also by way of line 134 to the A/D converter 128. The output of the A/D converter 128 is supplied by way of line 136 to a UART telemetry encoder and line driver 138 which takes each 12-bit output of the A/D converter and generates two 8-bit, serially encoded words having parity bits for error checking at the surface. The four extra bits in each second word supplied by the encoder 138 are used for encoding the origin of the data. The output from encoder 138 is supplied by way of lines 110, using a conventional phase encoding scheme, to the surface equipment. The encoder 138 is driven by the crystal oscillator 130 by way of line 140.

It should be noted that in the preferred form of the invention, the multiplexer 124 actually has eight input channels, four of which are used to obtain data from the accelerometers and the magnetometers, as described above. The remaining channels are available for additional detectors which monitor the temperature of the sensor, the voltage of the power supply, or the like. It will be noted that the multiplexer 124, the A/D converter 128, the oscillator 130, and the encoder 138 all are a part of the sensor electronics generally indicated at 88 in FIG. 4.

The equipment located in the sensor 26 operates continuously, taking data with a cycle time of eight seconds, in a preferred form of the invention. At the beginning of each cycle, all of the input channels to the multiplexer 124 are sampled once, sequentially; thereafter, only the alternating magnetic field channels are selected for the remainder of that cycle. Thus, for the bulk of a cycle, the outputs of the two AC magnetometers are sampled alternately, and the output data sent to the surface.

The surface apparatus includes, in addition to the wireline-handling equipment, signal processing electronics generally indicated at 142 in FIG. 5. This equipment includes a decoder 144 which receives the signal from UART encoder 138, a computer 146 for processing data received by way of line 148 from the decoder, a crystal oscillator 150, an electrode driver which operates as the AC source 44 for the downhole electrode 40, and a DC power supply 152 for the downhole electronics.

The power supply 152 preferably is included with the surface electronics, but if desired may be a part of the downhole package as illustrated in FIG. 4. In the embodiment illustrated in FIG. 5, DC power is supplied to the downhole electronics by way of lines 110, with the downhole unit 86 including current and voltage regulators connected to line 110 by way of line 108.

The data signals supplied on line 110 by the downhole encoder 138 are received by the decoder 144, which may include an amplifier and an optical isolator. The output signals from the decoder are fed into the computer, which may be an Apple IIe computer, which identifies the data and notes the time of arrival with respect to the timing edges supplied by the crystal oscillator 150 by way of line 154. Oscillator 150 also controls the phase of the current being sent to the electrode 40 or, if surface excitation is being used, to the electrode 60 illustrated in FIG. 3.

The computer 146 produces a Fourier analysis of the AC magnetometer data and then combines the resultant signals with data from the accelerometers to generate data indicating the apparent direction of the source of the detected magnetic field from the sensor 26, this information being provided for each cycle of the downhole electronics. The output signals representing the intensity and the apparent direction of the source are fed to a display unit, such as a printer, and are recorded on a magnetic disk. The manner in which the directional data is obtained will be explained hereinbelow.

Figure 6:
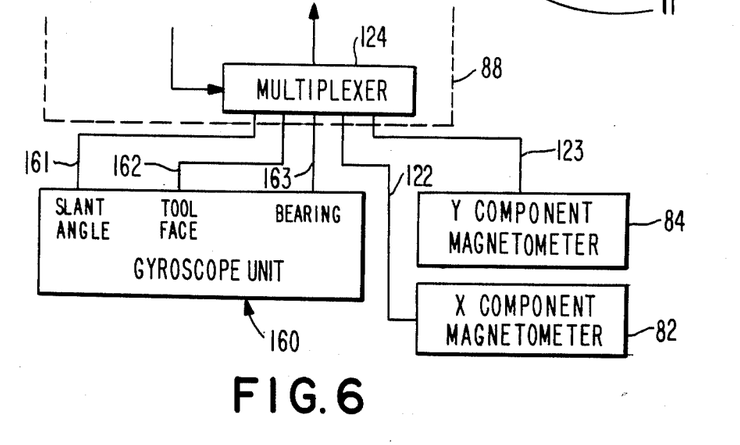
FIG. 6 is a partial block diagram of the circuitry of a second embodiment of the invention.

FIG. 6 illustrates an alternative embodiment of the system of FIG. 5 in which the x and y component accelerometers 96 and 98 are replaced by a gyroscope unit such as a Humphries 76-01-01, generally illustrated at 160. The gyroscope unit is connected to three inputs of the multiplexer by way of lines 161, 162, and 163, which lines carry data relating to the slant angle, tool face angle, and bearing, respectively, of the gyroscope unit 160. These outputs are used for orienting the sensor 26 in place of the accelerometers, with the remainder of the electronics remaining the same as that illustrated in FIG. 5.

Figure 7:
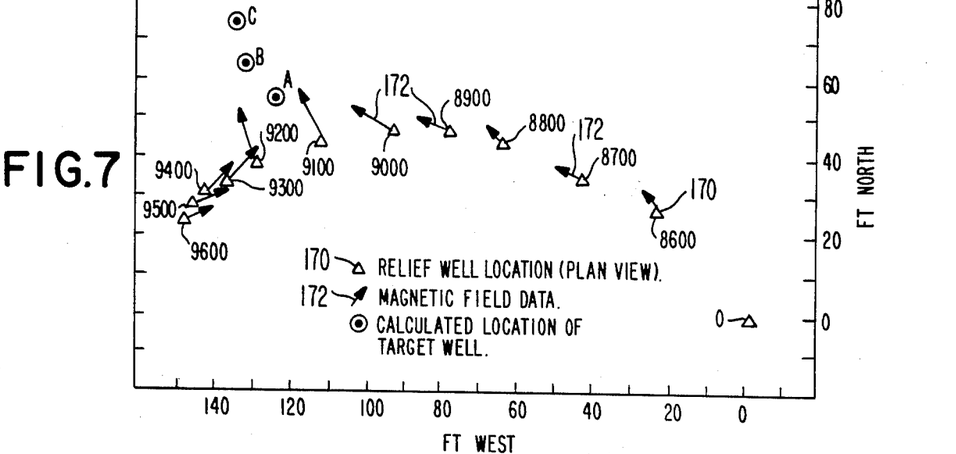
FIG. 7 is a plot of a series of measurements illustrative of the technique for calculating the distance and direction of a target well.

A convenient way to present the directional data obtained from the vector components of the magnetic field signals and the accelerometer output signals is to produce a plan view of the trajectory of the relief well as obtained from conventional well survey data, and to then superimpose on that plan view a resultant of the AC magnetic field vectors obtained at the various well depths. Such a technique is shown in U.S. Pat. No. 4,372,398, and is illustrated in FIG. 7, wherein the small triangles 170 indicate the measured location of the relief well, as viewed from the surface of the earth, at the various well survey points, which in this case were taken every 100 feet of depth. As shown, the well was drilled from an initial location at the 0—0 point. As it reached the 8,600-foot level, it began to move generally west-northwest, and then curved to the west and to the southwest as it progressed in depth to 9,600 feet. In this diagrammatic illustration, the relief well travelled approximately 130 feet west in the course of drilling 1,000 feet down. The resultant magnetic field vector obtained by measurement of the alternating magnetic field at each of the survey points are indicated by the arrows 172 at each survey point, the length of the arrow being proportional to the magnitude of the normalized signal and its direction indicating the normalized, or calculated, direction of the source of the field. The magnitude of each arrow is inversely proportional to the target distance. By hypothesizing three possible locations of the target well, as indicated by the circles A, B, and C, in FIG. 7, and by comparing these assumed locations with the data indicated by the magnetic field measurements, the actual location of the target well can be determined with a high degree of accuracy.

Figure 8:
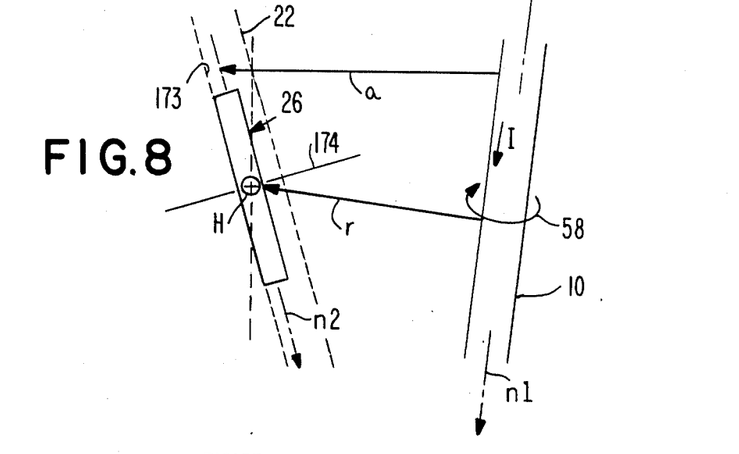
FIG. 8 is a diagrammatic illustration of the relationship of a target well and a sensor.

This same technique of plotting well survey data and superimposing the calculated direction of the source of the AC magnetic field for each survey point can be used, in accordance with the present invention, with data derived from the magnetometers 82 and 84 and the accelerometers 96 and 98 described with respect to FIG. 5. For purposes of calculating the vectors 172, it is assumed that the slant angle; i.e., the angle away from vertical, and the azimuthal direction of both the relief and target wells are approximately known in the region of the depth of measurements. These directions are illustrated in FIG. 8 by the unit vectors n1 for the target well and n2 for the relief well, both of which are shown as being at an arbitrary angle with respect to the vertical. For purposes of analysis, the positive directions of the vectors n1 and n2 are considered to be downhole, as illustrated in FIG. 8. The sensor 26 lies on the lowermost surface 173 of the sloping wall of the relief well 22, so that the axis of sensor 26 is parallel to the vector n2. The purpose of the measurements and calculations made in accordance with the present invention is to determine the vector a (FIG. 8) which is the vector line 172 of FIG. 7, and which is a horizontal line from the relief well at a location of sensor 26 to the target well, and to determine this vector at a true vertical depth with sufficient precision that the relief well direction indicated by the unit vector n2 can be changed so as eventually to intersect the target well which lies along the vector n1.

The small electric current I which is made to flow on the target well 10 by current injection from a downhole electrode or from surface electrodes as described above, produces the circular magnetic field 58 which lies in a plane perpendicular to the axis of the target well 10. Accordingly, at the site of the sensor 26 in the relief well 22, there will be a magnetic field vector H generated by the current I, the field vector having the same time variation as the current. As described above, the magnetometers which detect the AC field vector H are contained in the sensor 26, which lies against the lowermost sidewall 173 of the well in an arbitrary rotational position. The plane of measurement of the various detectors carried by the sensor 26 is generally indicated at 174 in FIG. 8, and is perpendicular to the axis n2 of the sensor. FIG. 9 is a diagrammatic illustration of the sensor 26 and its perpendicular plane 174 as viewed from the top, in the direction of the vector n2. As illustrated, the rotational position of the sensor within the relief well is such that the x axis of the magnetometers and the accelerometers, represented by vector 180, faces generally toward the lowermost side 173 of the relief well; the y-axis of the magnetometers and the accelerometers is indicated by the vector 182. It will be understood that although it is preferred that both the accelerometers and the magnetometers use the same x and y axes within the sensor for ease of calculation, these detectors may be mounted on different axes and their measurements mathematically compensated to common x and y axes.

The magnetic field vector H due to the current I in the relief well is determined, to a good approximation, by the following equation:

$$H = (I)(n1 \times r)/2\pi(r \cdot r) \qquad (1)$$

where r is a vector which is perpendicular to the axis of the target well (see FIG. 8) and which intersects the sensor site in the relief well. The term "x" signifies the vector cross-product, and the symbol "." signifies the vector dot product. The quantity r is a vector connecting points on the target and relief wells; it lies in the plane of the magnetic field 58, and is perpendicular to the target well direction n1.

Figure 10:
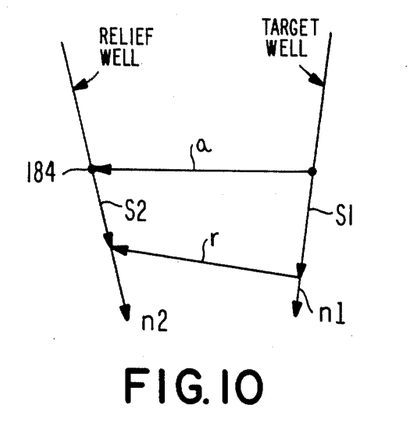
FIGS. 10 and 11 are vector diagrams of the calculations made to determine the distance and direction of the target well.

If it is assumed that at some vertical depth near the point of measurement, the horizontal vector a connecting the two wells is defined, and if the wells are effectively straight, then the vector r is readily found from vector a and from the measured depth intervals along the target and relief wells, indicated by the quantities s1 and s2, respectively. As illustrated in FIG. 10, $$r = (s1)(n1) + a + (s2)(n2) \qquad (2)$$

Thus, for a given measured depth interval s2 in the relief well, measured from a reference depth 184, the depth interval s1 on the target well, which is where the vector r intersects at a right angle with vector n1, can be found from the following equation:

$$r \cdot n1 = 0 = -s1 + (a \cdot n1) + (s2)(n2 \cdot n1) \qquad (3)$$

Rearranging the above gives:

$$s1 = (s2)(n2 \cdot n1) + (a \cdot n1) \qquad (4)$$

From the foregoing, the vector r can be determined. Sometimes, it is not sufficiently precise to consider the trajectory of the two wells to be straight but, in practice, curvature in the trajectories can be accounted for relatively easily, and, accordingly, this will not be considered here.

In the sensor 26, the magnetometers 82 and 84 measure the x and y components of the magnetic field vector H in plane 174, as explained above. Therefore, it is useful to determine the projection Hp of the vector H on plane 174, which is identified by vector line 186 in FIG. 9. The vector Hp can be found by subtracting from H that part of H which is parallel to n2, the axis of the sensor 26, as follows:

$$Hp = H - (H \cdot n2)(n2) \qquad (5)$$

Figure 11:
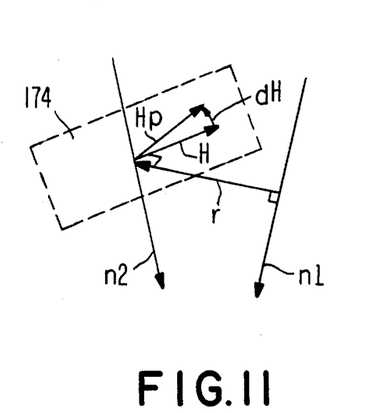

This is illustrated in FIG. 11, wherein the plane 174 which is perpendicular to the axis n2 of sensor 26 is generally illustrated in dotted outline. The field vector H and the radial vector r both lie in a plane rH which is perpendicular to the axis n1 of the target well, with the vector H forming a right angle with r, as illustrated. Vector H lies below the plane 174, in the case of the relative angles of the wells n1 and n2 illustrated in this figure, but its projecting Hp lies above it on plane 174, and is separated therefrom by a vector of length dH which is, in turn, perpendicular to Hp.

Since Hp is a projection onto a known plane (plane 174) of a vector H which also lies in a known, but different, plane (i.e., rH, the plane perpendicular to n1), then once Hp is determined, the value of vector H can be geometrically reconstructed simply by passing a perpendicular from plane 174. This perpendicular, indicated at dH, intersects the plane rH. This relationship can be written as follows:

$$H = Hp - (dH)(n2) \qquad (6)$$

dH is scalar quantity defining the vector difference between H and Hp as defined by this relation. To fluid dH, it is noted that H is perpendicular to n1, which is the direction of the current in the target well, so that:

$$H \cdot n1 = 0 = Hp \cdot n1 - (dH)(n1 \cdot n2) \qquad (7)$$

$$dH = (Hp \cdot n1)/(n1 \cdot n2) \qquad (8)$$

Accordingly, unless the two wells are perpendicular to each other, the measurement of Hp uniquely determines H by substituting equation (8) into equation (6).

The vector r can be found from the vector H and the current I from the relation:

$$r/(r \cdot r) = (2\pi)(H \times n1)/I \qquad (9)$$

For an assumed separation vector a between the relief and target wells, and for a known current I on the target well, an expected vector Hp at the defined depth in the relief well can be calculated, and this can be compared to measured values. Except for the singular case where the wells are perpendicular to each other, the determination of Hp uniquely fixes H and, therefore, r, and a.

With the foregoing relationships being known, all that remains is to determine the vector Hp and to orient it in space so as to provide a reference orientation for the direction of H, from which the distance and direction of the target can be obtained. The measurement of the magnetic field vector Hp is accomplished, in accordance with the present invention, by measuring the two vector components of Hp which lie along the x and y axes of the magnetometers 82 and 84. The x and y axes preferably are perpendicular to each other and lie in the plane 174 perpendicular to the axis sensor 26. The x and y vector components, which may be referred to as components H1 and H2, respectively, are measured by the magnetometers and those signals are transmitted uphole to the surface processing equipment, where the measurements H1 and H2 are combined vectorially to define the vector Hp relative to the tool axes. Preferably, the measurement of quantities H1 and H2 is done directly by the use of magnetometers whose axes of maximum sensitivity line up with the x and y axes; alternatively, however, these measurements can be done by algebraically combining the signals from two nonperpendicular magnetometers having a known relative orientation in the plane 174.

Having measured and defined the vector Hp relative to the tool axes further information is needed to determine the direction of the x and y axes in space. This can be obtained by combining the knowledge of the angle of vector n2 with a determination of the rotational orientation of the sensor in the borehole. The direction vector n2 as a function of depth in a relief well is usually well known, such data being provided by, for example the "seeker" tool operated by Eastman Whipstock, Inc. The rotational orientation can be obtained directly from the outputs of a commercially available surveying package utilizing a gyroscope, for example, which can be incorporated as an integral part of the sensor. Alternatively, and in the preferred mode of the invention, detectors such as accelerometers 96 and 98 which register the direction of gravity are utilized.

At the point of interest in the relief well, the direction of the unit vectors n1 and n2 are usually known from prior well surveys, as is the direction and magnitude of the earth's gravity, represented by vector G. This vector G may also be projected onto the plane 174, and is shown there as the gravity vector Gp (see FIG. 9). Since the accelerometers 96 and 98 are mounted with their axes of sensitivity aligned with the x and y axes 180 and 182 of the sensor, these accelerometers will measure the vector components of Gp along the x and y axes, and the signals representing these components are transmitted to the surface equipment, in the manner already described, where the vector component Gp is determined in accordance with the following equation:

$$Gp = G - (G \cdot n2)(n2) \tag{10}$$

The magnitude and direction of the vector Gp on plane 174 defines a unit vector bs which is perpendicular to the axis n2 of the sensor 26 and which points directly toward the bottom side of the sensor, where the sensor lies on the lowest side 173 of the relief well. The unit vector bs may be defined as follows:

$$bs = Gp/ABS(Gp) \tag{11}$$

where ABS(Gp) stands for the absolute magnitude of the vector Gp. The vector bs is indicated by the line 188 in FIG. 9, and, as illustrated, lies along the same line as the vector Gp.

An additional unit vector is also available, and is identified as vector 1s, shown at line 190 in FIG. 9. This vector is at a right angle to the vector bs, and points toward the left-hand side of the sensor 26, and thus of the relief well, when the sensor is viewed looking downhole in the direction of vector n2. The unit vector 1s may be defined as follows:

$$1s = (n2 \, X \, bs) \tag{12}$$

The unit vectors bs, 1s, and n2 constitute the basis for a right-handed coordinate system defined by the off-vertical relief well. This coordinate system may be considered as fixed to the relief well 22 and, together with the x and y sensor axes 180 and 182, provide in the plane 174 a set of coordinates to which all of the sensor outputs can be referenced. Assuming that the measurements of the vector components G1 and G2 of the earth's gravity and components H1 and H2 of the alternating magnetic field along the x and y axes 180 and 182 are ideal, the absolute magnitudes of the vectors Gp and Hp can be calculated, these absolute magnitudes being indicated by the symbols Gpm, and Hpm, respectively. Further, the angles g and h, which provide the angles of the vectors Gp and Hp from the sensor x axis 180, can also be determined, these angles being signed quantities which range in value from 0 to 360 degrees. Since the magnitude of the earth's gravity G and the inclination n2 of the sensor are known, Gp becomes a known vector. From all of the known quantities, it then becomes possible to find the angle h as well as the absolute magnitude of the vector Hp from the measurements obtained by the downhole magnetometers. Thus, Hpm is given by:

$$Hpm = + \sqrt{(H1)(H1) + (H2)(H2)} \tag{13}$$

For an off-vertical well, the angle (g+h) can be found from:

$$\cos(g+h) = H1/Hpm \tag{14}$$

$$\sin(g+h) = H2/Hpm \tag{15}$$

where H1 is the vector measured along the x axis, and H2 is the vector measured along the y axis in FIG. 9.

A complete determination of the angle g can be made from the measurements of the vector quantities G1 and G2, again along the x and y axes, by forming the quantities:

$$Gpm = + \sqrt{(G1)(G1) + (G2)(G2)} \tag{16}$$

$$\cos(g) = G1/Gpm \tag{17}$$

$$\sin(g) = G2/Gpm \tag{18}$$

This determination of the angle G has some redundancy since the quantity Gpm is known from the fact that the vector G, the direction of the earth's gravity, is already known, as is the value of the unit vector n2.

From the foregoing relationships, therefore, it is seen that from a measurement of the gravity vector G by means of the accelerometers and from a knowledge of the direction of the unit vector n2 of the relief well, the orientation of the sensor 26 within the well and thus of the direction of the reference axes 180 and 182 can be determined by calculating the angle g. Thereafter, the angle h can be calculated, and from the measured vector Hp, the magnetic field vector H can be determined both as to its intensity and its direction. This determination of the intensity and direction of the magnetic field vector permits an accurate determination of the direction of the source of the magnetic field, that is, the direction of the target well in which the current I flows. From these measurements, the magnitude and direction of the vector a which connects the relief and target wells in a horizontal plane at a depth other than the location of the sensor 26 can then be found from the measurements made by the sensor, using the mathematical framework described with respect to FIG. 10. In all of the determinations of the distance between the relief and target wells, however, a theoretical determination of the current I flowing in the blowout well must be obtained. Such information is readily available from published material. (See, for example, Kuckes, Lautzenheizer, Sigal, and Nekut, SPE Journal, June 1984, pp 269–274).

An alternative method of finding the direction and magnitude of the vector a is to make a series of determinations of Hpm and the angle h at a series of depths in the relief well. These results are then plotted as a function of depth. Thereafter, an initial value for the vector a is assumed and theoretical values of Hpm and the angle h are readily computed, using the mathematical framework outlined above for the depth intervals spanned by the measurements. The measured Hpm values on the plot can then be compared with the theoretical values, after fixing the current I at a "normalized" value so that the theoretical and measured values agree at one selected depth, and the plots of the angle h can be compared with the theoretical values of h by selecting successive values of the vector a. By repetitive comparison of the plotted values with the varied theoretical values of Hpm and the angle h, an iterative method can be followed which quickly leads to an optimized determination of both the distance and direction to the blowout well.

Although the foregoing analysis has been made in conjunction with measurements of the alternating magnetic field and earth's gravity, it will be understood that the orientation of the sensor 26 within the relief well may, in some circumstances, be facilitated by a measurement of a component of the earth's static magnitude field E, taken along one of the X or Y axes discussed above. Such a measurement, made in accordance with the teachings of the aforesaid U.S. Pat. No. 4372398, may be combined with a measurement of gravity along the same x or y axis to provide an accurate orientation of the sensor, even in the singular cases of a relief well being bored nearly vertically or nearly parallel to the earth's magnetic field lines. In those singular cases, the measurement of a single vector of the earth's magnetic field in addition to a vector of gravity is helpful; in all other cases, a sensor using two accelerometers with the two alternating field magnetometers is preferred.

Although the present invention has been set forth in terms of preferred embodiments, it will be understood that numerous modifications and variations may be made without departing from the true spirit and scope thereof, as set forth in the accompanying claims.

What is claimed is:

1. A method of locating from a first underground location the distance and direction of a second, target underground location, comprising:
    partially drilling a borehole at a location spaced from said target location;
    determining, at selected depth intervals, the inclination of said borehole;
    producing an alternating current flow at said target location to produce an AC magnetic field;
    lowering into said borehole a sensor tool having a longitudinal axis, said sensor tool carrying first and second AC magnetic field detectors and first and second gravity detectors;
    measuring, by means of said AC magnetic field detectors, the vector components of said AC magnetic field projected onto a reference plane perpendicular to said longitudinal axis;
    measuring, by means of said first and second gravity detectors, two components of the earth's gravitational field projected onto said reference plane;
    determining, from said AC field vector components, the direction and magnitude of said AC magnetic field with respect to said sensor tool;
    determining, from said components of the earth's gravitational field and from the inclination of said borehole, the orientation of said sensor tool; and
    determining from the orientation of said sensor tool, the direction and magnitude in space of said AC magnetic field and thereby the direction and distance of said target location from said sensor tool.

2. The method of claim 1, further including aligning said first and second AC magnetic field detectors along x and y axes, respectively, of said reference plane, and aligning said first and second gravity detectors with said x and y axes, respectively, of said reference plane for measuring x and y vector components of said AC magnetic field and of the earth's gravitational field.

3. The method of claim 1, further including:
    determining, from the direction and magnitude in space of said AC magnetic field the radial distance from said target location to said sensor tool at a first depth in said borehole;
    determining the horizontal distance and direction from said sensor tool to said target location at said first depth; and
    thereafter determining the horizontal distance and direction between said borehole and said target location at selected other depths.

4. The method of claim 1, wherein the step of determining the direction of said target location includes:
    repetitively measuring the AC magnetic field vectors and gravitational field vectors at successive depths of said borehole;
    obtaining for each successive depth the direction and magnitude of said AC magnetic field and a horizontal vector representing direction and distance of said target location;
    calculating, from initial assumed values of the horizontal vector representing the direction and distance of said target location at said first depth, a plurality of theoretical values of the direction and magnitude of the AC magnetic field at said sensor tool at said successive depths; and
    repetitively comparing measured and theoretical values of said AC magnetic field at said sensor tool at corresponding depths to obtain an optimized value of the horizontal vector at selected depths.

5. Apparatus for locating from a first underground location the distance and direction to a second, electrically conductive, target underground location, comprising:
    an electrode in contact with the earth for injecting current therein to produce an alternating current in said target location, said target location current producing an AC magnetic field in the surrounding earth;
    sensor means at said first underground location, said sensor means having a longitudinal axis and including:
        (a) first and second AC magnetic field detectors having x and y axes of sensitivity in a reference plane perpendicular to the longitudinal axis of said sensor means and producing first and second output signals representing x and y vector components of said AC magnetic field projected on said plane;
        (b) first and second gravitational field detectors having x and y axes of sensitivity and producing third and fourth output signals representing x and y vector components of the earth's gravitational field projected on said plane; and
        (c) circuit means connected to said detectors for receiving said output signals sequentially and for transmitting said signals;
    receiver means connected to said sensor means for receiving signals transmitted thereby; and computer means connected to said receiver means for processing said first, second, third and fourth output signals to calculate the horizontal direction and distance of said target from said sensor.

6. The apparatus of claim 5, wherein said first and second gravitational field detectors have their x and y axes of sensitivity aligned with said x and y axes, respectively, of said first and second AC magnetic field detectors.

7. A method of locating from a first underground location the distance and direction to a second, target underground location, comprising:
- partially drilling a borehole at a location spaced from said target location;
- determining at selected depth intervals, the inclination of said borehole;
- producing an alternating current flow at said target location to produce an AC magnetic field;
- lowering into said borehole a sensor tool having a longitudinal axis, said sensor tool carrying first and second AC magnetic field detectors, at least one gravity detector, and at least one static magnetic field detector;
- measuring, by means of said first and second AC magnetic field detectors, first and second vector components of said magnetic field projected onto a reference plane perpendicular to said longitudinal axis;
- measuring, by means of said gravity detector, one component of the earth's gravitational field projected onto said reference plane;
- measuring, by means of said static magnetic field detector, one component of the earth's static magnetic field projected onto said reference plane;
- determining, from said AC field vector components, the direction and magnitude of said AC magnetic field with respect to said sensor field;
- determining, from said component of the earth's gravitational field, from said component of the earth's static magnetic field, and from the inclination of said borehole, the orientation of said sensor tool; and
- determining, from the orientation of said sensor tool, the direction and magnitude in space of said AC magnetic field and thereby the direction and distance of said target location from said sensor tool.

8. The method of claim 7, further including measuring said one component of the earth's static magnetic field in a direction parallel to the measurement of said one component of the earth's gravitational field.

9. The method of claim 7, further including:
- determining, from the direction and magnitude in space of said AC magnetic field, the radial distance from said target location to said sensor tool at a first depth in said borehole;
- determining the horizontal distance and direction from said sensor tool to said target location at said first depth; and
- thereafter determining the horizontal distance and direction between said borehole and said target location at selected other depths.

10. The method of claim 7, wherein the step of determining the direction of said target location includes:
- repetitively measuring the AC magnetic field vectors, the gravitational field vector, and the earth's magnetic field vector at successive depths of said borehole;
- obtaining for each successive depth the direction and magnitude of said AC magnetic field and obtaining a horizontal vector representing the direction and distance to said target location from said sensor tool;
- calculating, from initial assumed values of said horizontal vector, a plurality of theoretical values of the AC magnetic field at said sensor tool; and
- repetitively comparing the measured and the theoretical values of said AC magnetic field at said sensor tool for successive depths of said sensor tool in said borehole to obtain an optimized value of said horizontal vector at said successive depths.

* * * * *